(12) United States Patent
Pappas

(10) Patent No.: US 6,223,900 B1
(45) Date of Patent: May 1, 2001

(54) FREESTANDING, MULTIPLE COMPARTMENT CONTAINER

(76) Inventor: Jean Pappas, 1056 Neill Ave., Bronx, NY (US) 10461

( * ) Notice: Subject to any disclaimer, the term of this patent is extended or adjusted under 35 U.S.C. 154(b) by 0 days.

(21) Appl. No.: 09/549,663

(22) Filed: Apr. 14, 2000

Related U.S. Application Data

(63) Continuation-in-part of application No. 09/318,928, filed on May 26, 1999.

(51) Int. Cl.⁷ .................................................. B65D 69/00
(52) U.S. Cl. .......................... 206/576; 206/581; 206/373; 312/229
(58) Field of Search ..................... 206/581, 77.1, 206/516, 562, 373, 372, 504, 213.1, 315.1; 220/601, 523, 625; 312/126, 198, 229

(56) References Cited

U.S. PATENT DOCUMENTS 5,118,173 * 6/1992 Proctor et al. ...................... 312/213
6,050,660 * 4/2000 Garley ............................... 312/249.1

* cited by examiner

Primary Examiner—Paul T. Sewell
Assistant Examiner—Shian Luong
(74) Attorney, Agent, or Firm—Bierman, Muserlian and Lucas

(57) ABSTRACT

The freestanding multiple compartment container has at lest three compartments, a central compartment, an upper compartment, and a lower compartment. The upper and lower compartments are connected to the central compartment by means of L-shaped brackets that fit in corresponding openings in the central compartment. The compartments bottom walls can have holes therein to allow for drainage of water or a tray with holes therein to allow for drying of sponges and the like. The container is intended for use in the kitchen to hold items such as sponges, soap and steel wool pads, in the bathroom to hold toothbrushes, toothpaste and soap, and on a desk to hold pens, pencils, paper clips and the like.

13 Claims, 4 Drawing Sheets

FREESTANDING, MULTIPLE COMPARTMENT CONTAINER

CROSS-REFERENCE TO RELATED APPLICATIONS

This application is a continuation-in-part of U.S. patent application Ser. No. 09/318,928 filed May 26, 1999.

BACKGROUND OF INVENTION

1. Field of Invention

This invention relates to a container which sits on countertops and desktops and holds an assortment of items. More specifically, the present invention relates to a unique arrangement of separate, but connected compartments which sit on a desktop, a bathroom counter, or a kitchen counter to neatly hold assorted items.

2. Art Related to Invention

Different styles of containers have been proposed in the past for holding bathroom items such as tooth brushes, soap, and the like; desk items such as pens and paper clips, and kitchen items such as bars of soap and sponges. Oftentimes, these containers are intended to be wall mounted and are complicated in design and expensive to manufacture. There is a need for a simple, inexpensive freestanding container which has multiple purpose utility.

SUMMARY OF INVENTION

A freestanding, multiple compartment container has now been discovered. The container of the present invention is intended to be freestanding so that it sits on a horizontal surface such as a desk, kitchen countertop, or a bathroom countertop. The present invention has multiple compartments to neatly hold items. For example, at the kitchen sink, it holds soap, steel wool, sponges; or on the desk it holds pens, pencils and paper clips, while on the bathroom countertop it holds toothbrushes, toothpaste, and dental floss.

The multiple compartments of the present invention comprises three different compartments which can be combined to form a container with 3, 4 or 5 compartments. Each compartment is connected to one another through a central compartment and are detachable from one another to allow for different arrangements of the compartments. Each container has at least one lower compartment and one upper compartment, each of which is connected to the central compartment.

Each compartment is made from a hard, durable plastic material which is easy to clean and inexpensive to mold. Because each compartment is independent of the other compartments, it can be decorated separately or coordinated with the other compartments. It can be made with clear or colored plastic or made with an exterior decoration or decal. The colors can be somber to suit an adult's desk, bright to match the kitchen decor, or wild to match a child's desk.

Each compartment is a rectangular prism having an open top and closed sidewalls and closed bottom wall. The overall dimensions of the container is relatively small, 4 inches×4 inches×5 inches, such that it easily fits on the desk or countertop and is a neat, organizational tool. Preferably, the central compartment measures about 4 inches in height, 4 inches in width and 2 inches in depth. Preferably, each upper and lower compartment measures 1 inch in height, 4 inches in width and 3 inches in depth. Each compartment is preferably made from ⅛ inch plastic such that each wall has a ⅛ inch thickness. As such, the container will be small in shape, inexpensive to manufacture, durable and light in weight.

The size can vary depending on its intended purpose. For example, one intended for use on a desk may be smaller than one intended for use in the kitchen. However, the overall proportional dimensions should be maintained for purpose of stability. Broadly, the freestanding multiple compartment container comprises:

- a single central compartment which is a vertically oriented rectangular prism having an open top, solid sidewalls and a solid bottom, said central compartment having a height and a width approximately equal to each other and a depth which is about ½ its width or height, said central compartment having four horizontally oriented openings, one along the top of each long sidewall and one along the bottom of each long sidewall, said long sidewalls defining the width of the central compartment;
- at least one upper compartment which is a vertically oriented prism having an open top, solid sidewalls and a solid bottom, said upper compartment having a height which is less than ½ the height of the central compartment and a width equal to the width of the central compartment, an L-shaped bracket affixed along a top edge of a long sidewall of said upper compartment, said L-shaped bracket oriented downward and removably fitted into one of the horizontally oriented openings of said central compartment which is positioned along the top of a long sidewall of the central compartment; and
- at least one lower compartment which is a vertically oriented prism having an open top, solid sidewalls and a solid bottom, said lower compartment having a height which is less than ½ the height of the central compartment and a width equal to the width of the central compartment, an L-shaped bracket affixed along a bottom edge of a long sidewall of said lower compartment, said L-shaped bracket oriented upward and removably fitted into one of the horizontally oriented openings of said central compartment which is positioned along the bottom of a long sidewall of the central compartment.

The container of the present invention can further comprise a second upper compartment and/or a second lower compartment which is removably fitted to the central compartment along the other opening of the central compartment, the other bottom opening for the second lower compartment or the other top opening for the second upper compartment.

Preferably, each L-shaped bracket runs the entire length of the long sidewall of its compartment.

The L-shaped bracket is preferably positioned only along one of the long sidewalls, however, it can be positioned along both of the long sidewalls, i.e. for the upper compartment along the top edge of each of the long sidewalls and for the lower compartment along the bottom edge of each of the long sidewalls. In this way, the upper and/or lower compartments can be attached between two central compartments to increase the size of the container.

The upper and lower compartments preferably have a depth which is less than their width.

Preferably, the upper compartment has holes in its bottom wall so that a steel wool pad can drip water to the lower compartment and thereby dry. Alternatively, a removeable tray having holes therein is situated inside and in the bottom of the upper, lower or central compartment. Such a tray allows water to fall into the bottom of the compartment and for items contained therein to dry. The water readily evaporates from the bottom of the compartment. The tray also allows air to circulate around the item and for the item to dry faster.

In the kitchen environment, the central compartment is intended to hold a sponge, the lower compartment to hold a bar of soap, and the upper compartment to hold a steel wool pad. In the office/desk environment, the central compartment is intended to hold pens and pencils, while the upper and lower compartments hold paper clips, rubber bands, and small note paper. In the bathroom environment, the central compartment holds toothbrushes and toothpaste, the upper compartment holds beauty aids while the lower compartment holds a bar of soap.

To make each of the compartments, they are individually molded from plastic using conventional plastic material and in a conventional manner.

BRIEF DESCRIPTION OF DRAWINGS

These and other aspects of the present invention may be more fully understood by reference to one or more of the following drawings wherein.

DETAILED DESCRIPTION OF INVENTION

Figure 1:
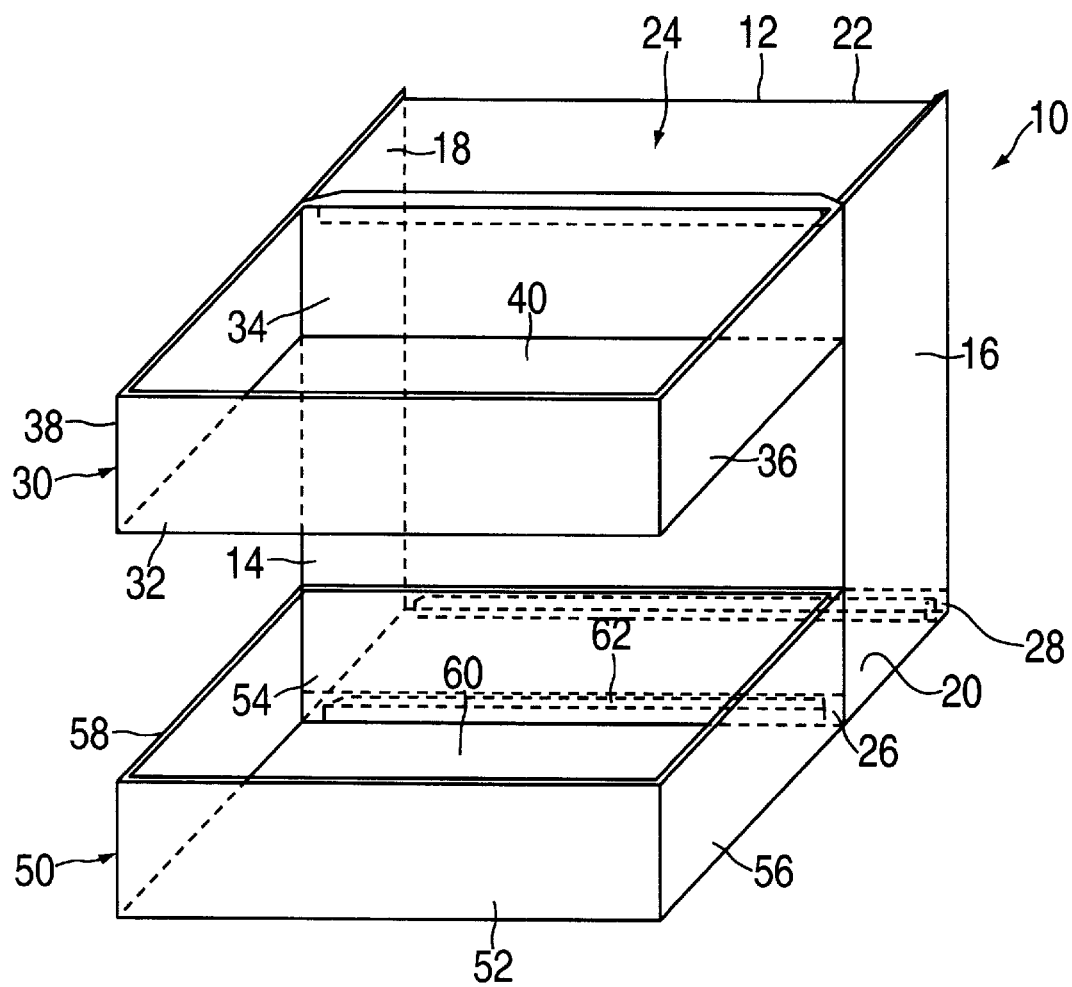
FIG. 1 is a perspective view of the container of the present invention with one upper and one lower compartment.

Referring to FIG. 1, central compartment 10 has long sidewalls 12 and 14, short sidewalls 16, 18, and bottom wall 20. Central compartment 10 is open at the top. Running horizontally along each long sidewall is an opening, labelled 22, 24, 26 and 28, respectively. Opening 22 and 24 are at the top of their respective sidewalls while opening 26 and 28 are at the bottom of their respective sidewalls.

Upper compartment 30 is connected to central compartment 10 along its top edge. Upper compartment 30 is open at the top and has two long sidewalls 32, 34, two short sidewalls 36, 38, and bottom wall 40. Running horizontally along the top edge of long sidewall 34 is downwardly oriented L-shaped bracket 42. Downwardly oriented L-shaped bracket 42 fits into opening 24 to removably connect central compartment 10 to upper compartment 30.

Lower compartment 50 is connected to central compartment 10 along its bottom edge. Lower compartment 50 is open at the top and has two long sidewalls 52, 54, two short sidewalls 56, 58, and bottom wall 60. Running horizontally along the bottom edge of long sidewall 54 is upwardly oriented L-shaped bracket 62. Upwardly oriented L-shaped bracket 62 fits into opening 26 to removably connect central compartment 10 to upper compartment 50.

Figure 2:
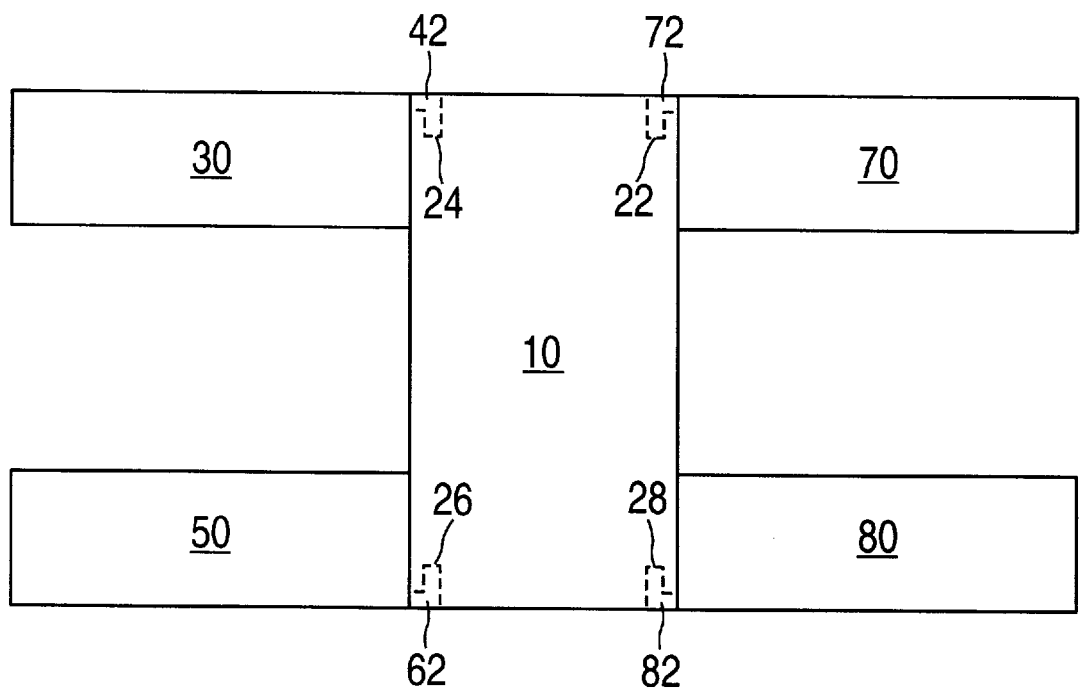
FIG. 2 is a side view of the container of the present invention with two upper compartments and two lower compartments.

FIG. 2 is a side view of central compartment 10 having upper compartment 30; lower compartment 50; a second upper compartment 70 with downwardly oriented L-shaped bracket 72 removably attached to central compartment 10 by opening 22; and second lower compartment 80 with upwardly oriented L-shaped bracket 82 removably attached to central compartment 10 by opening 28.

Figure 3:
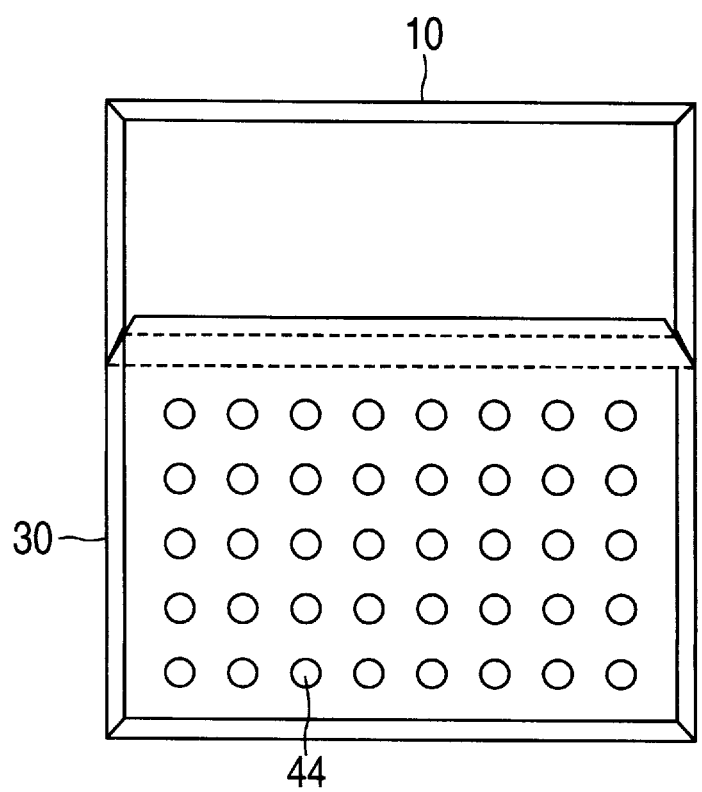
FIG. 3 is a top view of the container of the present invention with an upper compartment having holes in its bottom wall.

FIG. 3 illustrates a top view of central compartment 10 with upper compartment 30 having bottom wall 40 having holes 44 therein. The holes allow for drainage of water and drying of items contained therein.

Figure 4:
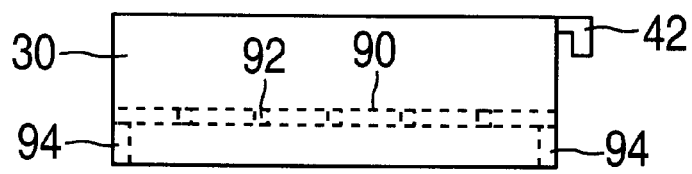
FIG. 4 is a side view of an upper compartment detached from the central compartment with a removeable tray therein.
Figure 5:
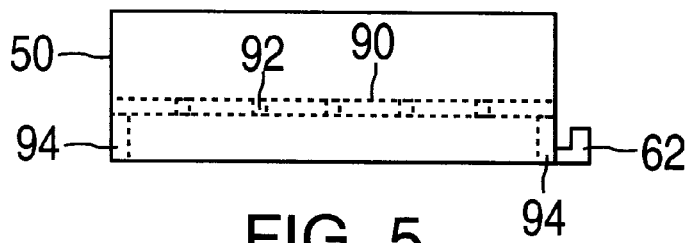
FIG. 5 is a side view of a lower compartment detached from the central compartment with a removeable tray therein.
Figure 6:
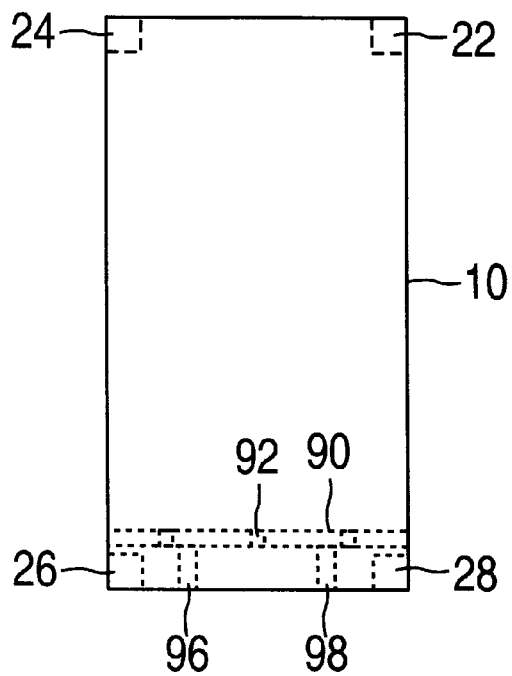
FIG. 6 is a side view of the central compartments detached from the upper and lower compartments with a removeable tray therein.

FIGS. 4, 5 and 6 are cutaway side view of upper compartment 30, lower compartment 50 and central compartment 10. Each is shown with a tray 90 positioned therein having holes 92 and legs 94, 96, 98 that elevate tray 90 above the respective bottom wall. Tray 90 allows for drainage of water and drying of items in the respective compartment. As shown, legs 94 are along sidewalls of compartments 30 and 50 while legs 96, 98 are set inward away from openings 26, 28. This is so legs 96, 98 do not interfere with brackets 62, 82.

Figure 7:
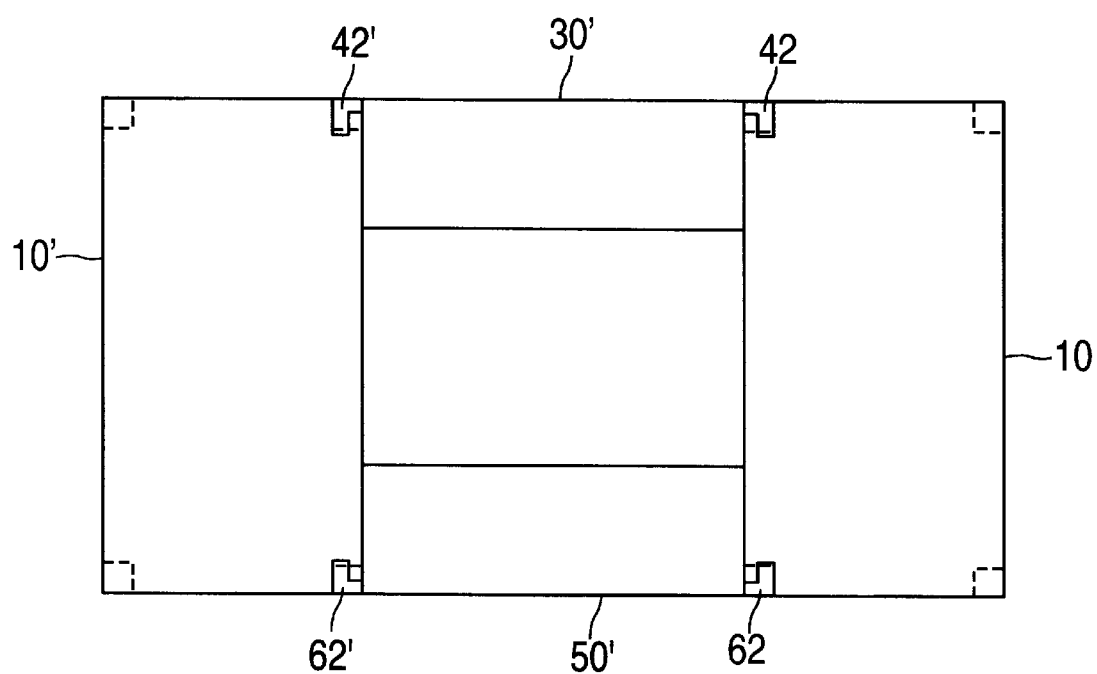
FIG. 7 is a side view of two central compartments connected by an upper and lower compartment, each of which has two L-shaped brackets.

FIG. 7 illustrates two central compartments 10, 10' interconnected by upper compartment 30' having two L-shaped brackets 42 and 42' and lower compartment 50' with two L-shaped brackets 62, 62'. As is apparent, using compartments 30' and/or 50', a number of central compartments 10, 10', etc. can be interconnected.

One example for the size of the various compartments is as follows:

| Central compartment 10 | |
| --- | --- |
| Vertical height | 4 inches |
| Width (long sidewall) | 4 inches |
| Depth (short sidewall) | 1¾ inches |
| Upper and lower compartments 30, 50 | |
| Vertical height | 1 inch |
| Width (long sidewall) | 4 inches |
| Depth (short sidewall) | 3 inches |
| Wall thickness | ⅛ inch |

It will be understood that the claims are intended to cover all changes and modifications of the preferred embodiments of the invention herein chosen for the purpose of illustration which do not constitute a department from the spirit and scope of the invention.

What is claimed is:

1. A freestanding multiple compartment container comprising:

a single central compartment which is a vertically oriented rectangular prism having an open top, solid sidewalls and a solid bottom, said central compartment having a height and a width approximately equal to each other and a depth which is about ½ its width or height, said central compartment having four horizontally oriented openings, one along the top of each long sidewall and one along the bottom of each long sidewall, said long sidewalls defining the width of the central compartment;

at least one upper compartment which is a vertically oriented prism having an open top, solid sidewalls and a solid bottom, said upper compartment having a height which is less than ½ the height of the central compartment and a width equal to the width of the central compartment, an L-shaped bracket affixed along a top edge of a long sidewall of said upper compartment, said L-shaped bracket oriented downward and removably fitted into one of the horizontally oriented openings of said central compartment which is positioned along the top of a long sidewall of the central compartment; and at least one lower compartment which is a vertically oriented prism having an open top, solid sidewalls and a solid bottom, said lower compartment having a height which is less than ½ the height of the central compartment and a width equal to the width of the central compartment, an L-shaped bracket affixed along a bottom edge of a long sidewall of said lower compartment, said L-shaped bracket oriented upward and removably fitted into one of the horizontally oriented openings of said central compartment which is positioned along the bottom of a long sidewall of the central compartment.

2. The container of claim 1 wherein the L-shaped bracket extends the entire length of the long sidewall of said upper compartment.

3. The container of claim 1 wherein the L-shaped bracket extends the entire length of the long sidewall of said lower compartment.

4. The container of claim 1 wherein said upper compartment has drain holes in its bottom wall.

5. The container of claim 1 wherein a tray having holes therein is positioned against the bottom wall of said upper compartment.

6. The container of claim 1 wherein a tray having holes therein is positioned against the bottom wall of said lower compartment.

7. The container of claim 1 wherein a tray having holes therein is positioned against the bottom wall of said central compartment.

8. The container of claim 1 wherein said upper compartment has a second downwardly oriented L-shaped bracket affixed to the top of the other long sidewall of said upper compartment.

9. The container of claim 1 wherein said lower compartment has a second upwardly oriented L-shaped bracket affixed to the bottom of the other long sidewall of said lower compartment.

10. The container of claim 1 further comprising a second upper compartment which is a vertically oriented prism having an open top, solid sidewalls and a solid bottom, said upper compartment having a height which is less than ½ the height of the central compartment and a width equal to the width of the central compartment, an L-shaped bracket affixed along a top edge of a long sidewall of said upper compartment, said L-shaped bracket oriented downward and removably fitted into one of the horizontally oriented openings of said central compartment which is positioned along the top of a long sidewall of the central compartment.

11. The container of claim 1 further comprising a second lower compartment which is a vertically oriented prism having an open top, solid sidewalls and a solid bottom, said lower compartment having a height which is less than ½ the height of the central compartment and a width equal to the width of the central compartment, an L-shaped bracket affixed along a bottom edge of a long sidewall of said lower compartment, said L-shaped bracket oriented upward and removably fitted into one of the horizontally oriented openings of said central compartment which is positioned along the bottom of a long sidewall of the central compartment.

12. The container of claim 10 further comprising a second lower compartment which is a vertically oriented prism having an open top, solid sidewalls and a solid bottom, said lower compartment having a height which is less than ½ the height of the central compartment and a width equal to the width of the central compartment, an L-shaped bracket affixed along a bottom edge of a long sidewall of said lower compartment, said L-shaped bracket oriented upward and removably fitted into one of the horizontally oriented openings of said central compartment which is positioned along the bottom of a long sidewall of the central compartment.

13. The container of claim 12 wherein both said upper compartments have trays with holes therein positioned against their bottom walls.

\* \* \* \* \*